United States Patent [19]

Heilmann

[11] 4,174,730

[45] Nov. 20, 1979

[54] HOUSING FOR AIR SERVICE UNITS

[75] Inventor: Roland Heilmann, Neuenhaus, Fed. Rep. of Germany

[73] Assignee: J. Lorch Gessellschaft & Co. KG, Waldenbuch, Fed. Rep. of Germany

[21] Appl. No.: 814,929

[22] Filed: Jul. 12, 1977

[30] Foreign Application Priority Data

Jun. 20, 1977 [DE] Fed. Rep. of Germany ....... 7622478

[51] Int. Cl.² ............................................. E03B 7/07
[52] U.S. Cl. ................................... 137/271; 137/546; 137/884
[58] Field of Search ........................ 137/271, 884, 546

[56] References Cited

U.S. PATENT DOCUMENTS

| 1,733,421 | 10/1929 | Mauran | 137/271 |
| 3,503,414 | 3/1970 | Schnellmann | 137/884 |
| 3,581,762 | 6/1971 | Bracki | 137/271 |
| 3,756,274 | 9/1973 | Wolfgramm | 137/884 |
| 3,949,777 | 4/1976 | Caldwell | 137/271 |
| 4,080,983 | 3/1978 | Stumpmeier | 137/271 |

FOREIGN PATENT DOCUMENTS 1206828 9/1970 United Kingdom ..................... 137/884

*Primary Examiner*—William R. Cline
*Assistant Examiner*—H. Jay Spiegel
*Attorney, Agent, or Firm*—Lawrence R. Radanovic

[57] ABSTRACT

A housing which can be employed equally for air service units such as a water separator, a pressure regulating valve and a filter/pressure reducer, includes a body member in the form of a cube having perpendicularly related first, second and third opposing sidewalls, the body member having a flow passage with an inlet and outlet thereof disposed co-axially and being respectively located in the first opposing sidewalls. A receiving chamber and valve seat are located in the path of the flow passage, and the bottom member has a bore for guiding the valve body of the pressure regulating valve or of the filter/pressure reducer for controlling flow through the passage as the valve body engages the valve seat. A bayonet connection union is located on one of the second opposing sidewalls for interconnection with a collector bowl of the water separator or of the filter/pressure reducer or for interconnection with a closure lid of the pressure regulating valve. A screw connection union is located on the other of the second opposing sidewalls for interconnection with a compression spring member of the pressure regulating valve or of the filter/pressure reducer or for connection with a cover cap of the water separator. A snap connection member is located on the one of the second opposing sidewalls adjacent the receiving chamber for interconnection with a bell element containing a filter of the water separator or of the filter/pressure reducer, and a guide cylinder is located on the other of the second opposing sidewalls for the sliding reception of a spring plate in engagement with the valve body of the water separator or of the filter/pressure reducer.

3 Claims, 10 Drawing Figures

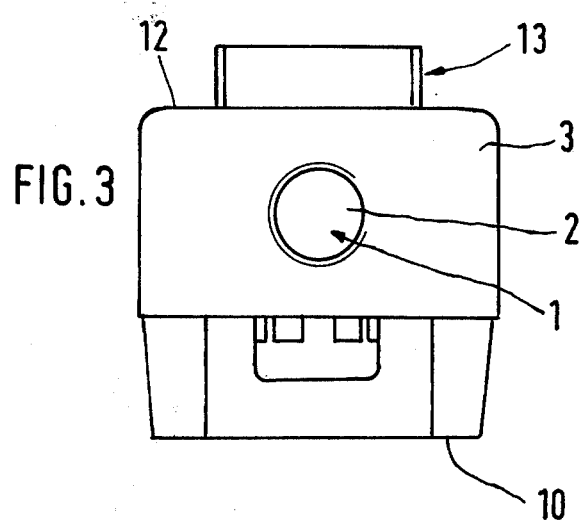
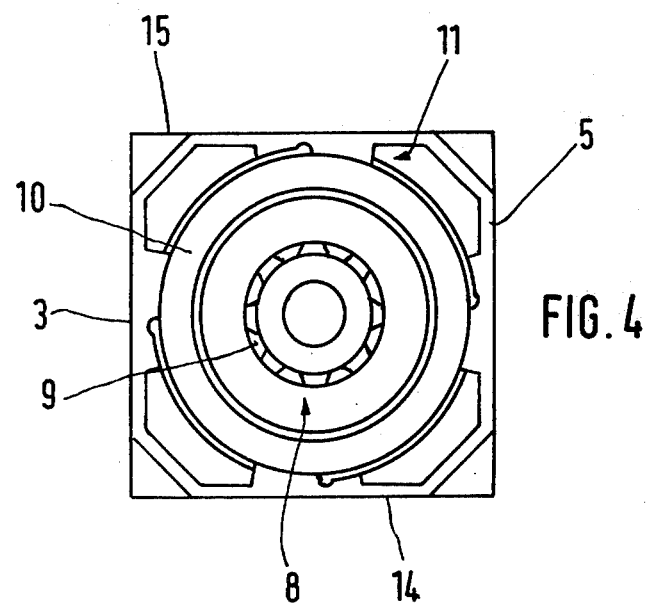

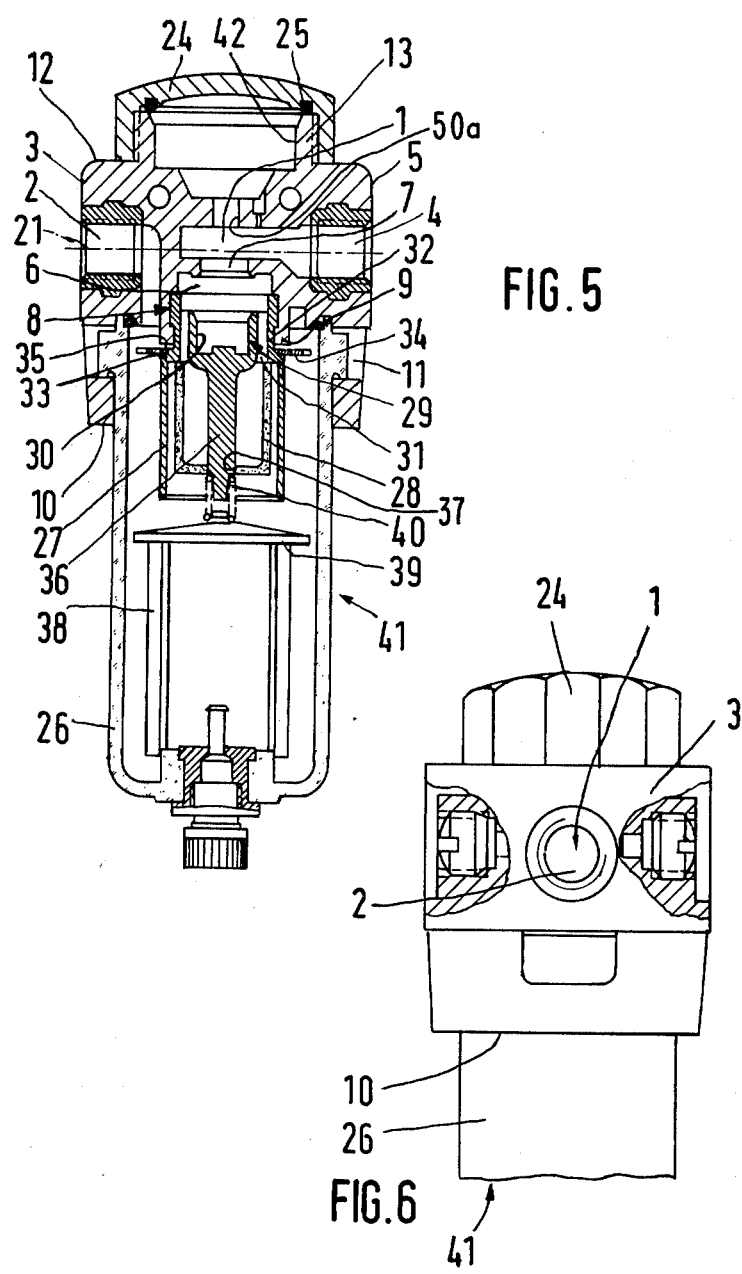

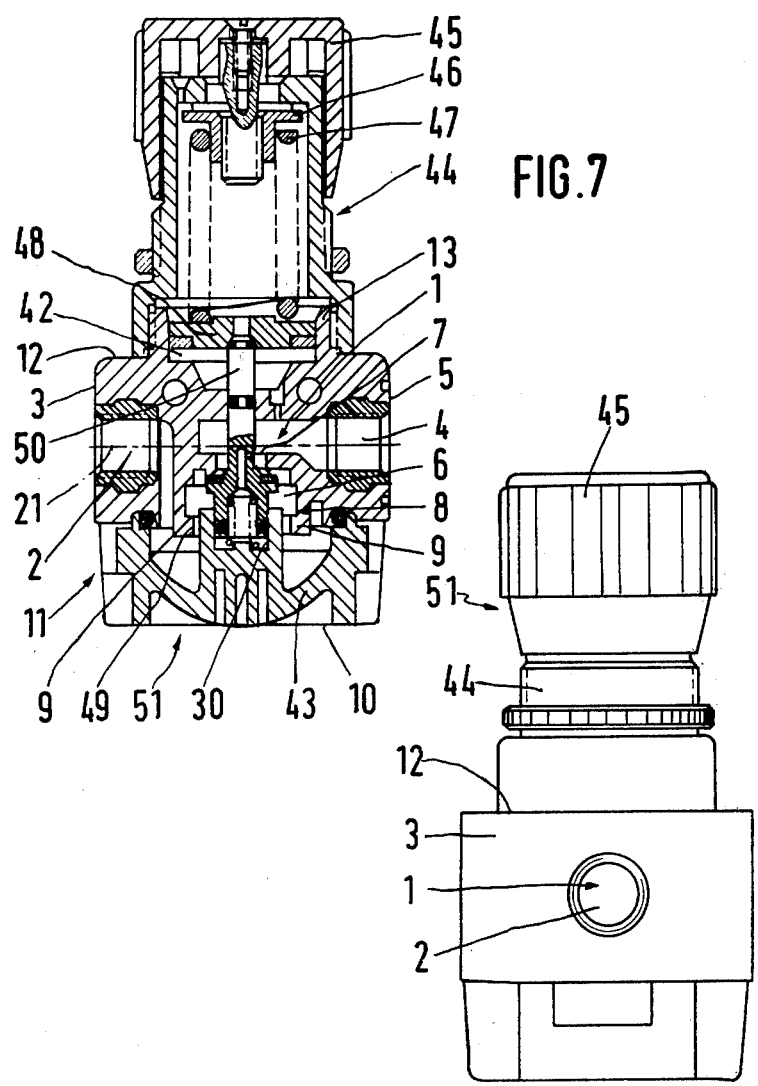

HOUSING FOR AIR SERVICE UNITS

The present invention relates to a housing for air service units having a flow passage extending through a receiving chamber, the inlet and outlet of the flow passage being arranged on the same axis respectively at opposite sides of the housing and having, respectively on other opposite sides, a bayonet union and a screw union. Air service units of this type, include water separators, pressure regulating valves and filter/pressure reducers which are installed in compressed air lines in order to clean the compressed air and to stipulate the pressure conditions. Known units of this type previously required different housings.

It is the object of the present invention to provide a housing for air service units of the type which can be employed equally for all three units, i.e. for the water separator, the pressure regulating valve and the filter/pressure reducer, whereby the components required for completion can be appropriately matched, thereby permitting the units themselves to be fabricated economically.

According to the present invention, this objective is carried out by providing a snap connection member in the area of the aforementioned bayonet union and a guide cylinder in the area of the aforementioned screw union and, if the housing is employed for a water separator, a collector bowl is connected by means of the bayonet union, a filter with a surrounding bell is connected by means of the snap connection member and a cover cap is connected by means of the screw union. If the housing is employed for a pressure regulating valve, a closure lid is connected by means of the bayonet union, a compression spring member having a spring plate is guided in the guide cylinder and a valve body attached to the spring plate is connected by means of the screw union. If the housing is employed for a filter/pressure reducer, a collector bowl is connected by means of the bayonet union, a filter with a surrounding bell is connected by means of the snap connection member and a compression spring member having a spring plate is guided in a guide cylinder, and a valve body is attached to the spring plate by means of the screw union. In this manner, the housings can be fabricated in large quantities, thereby permitting the cost of the moulds for the complicated housing of plastic to be amortized more easily. Stocking is also simplified, and the assembly components can be made uniform.

Further details of the present invention will now be described in more detail on the basis of the practical example shown in the drawings, in which FIG. 1 is a front elevational view of the housing according to the invention;

FIG. 3 is a left side view of the FIG. 1 housing;

FIG. 4 is a bottom plan view of the FIG. 1 housing;

FIG. 5 is a vertical sectional view taken through the housing according to the invention in combination with a water separator;

FIG. 6 is a side elevational view of FIG. 5 shown partly broken away;

FIG. 7 is a vertical sectional view taken through the housing according to the invention in combination with a pressure regulating;

FIG. 8 is a side elevational view of FIG. 7;

Figure 1:
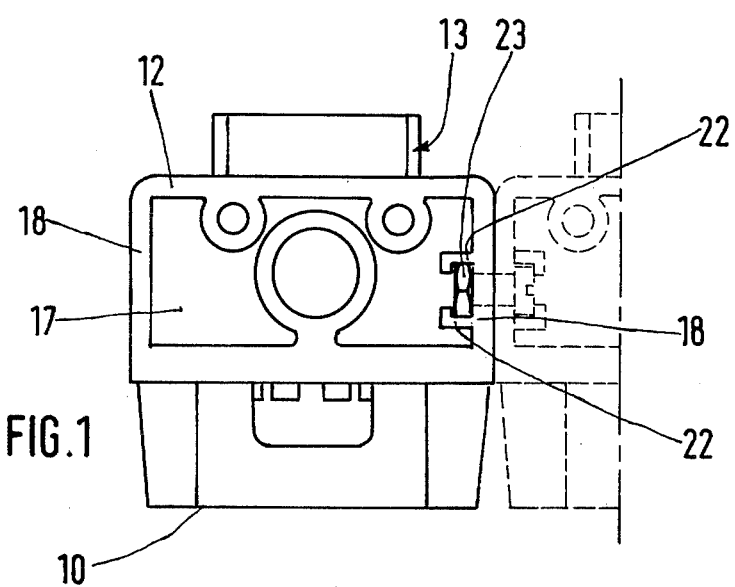
Figure 2:
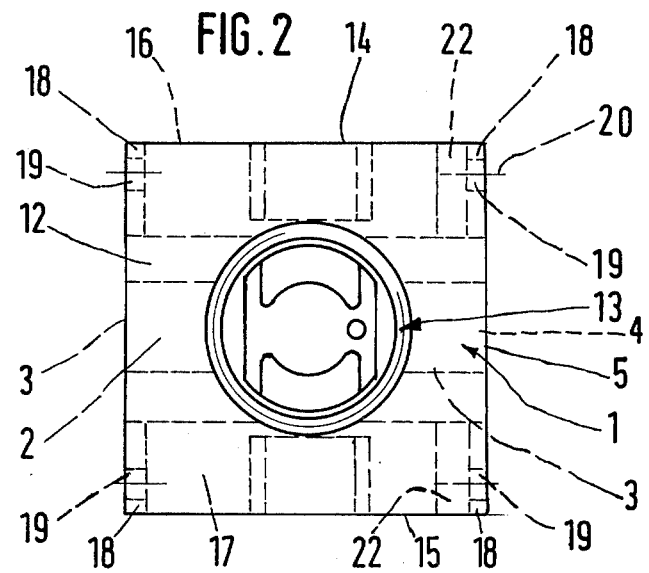
FIG. 2 is a top plan view of the FIG. 1 housing.

The housing shown in the drawings is of plastic material, and is in the form of a cube having a generally square base. It contains a flow passage 1 having an inlet 2 located on one side 3, and an outlet 4 located on opposite side 5; inlet 2 and outlet 4 being arranged on the same axis. Located in flow passage 1, between inlet 2 and outlet 4, is a receiving chamber 6 which communicates with outlet 4 via a valve face opening 7 defining a valve seat. In the area of receiving chamber 6, the housing is designed in the form of a snap connection member 8 comprising a ring of resilient tongues 9.

On the bottom side 10, the housing is equipped for a bayonet union 11, and on the upper side 12, the housing is equipped for a screw union 13. The remaining sides 14, 15 of the housing contain recesses 16, 17 which form side walls 18 each having an opening 19, axes 20 of these openings being parallel to axis 21 of flow passage 1. Retention slots 22 for positive seating of nuts 23 are disposed on side walls 18 along side 5 in the area of openings 19. In this manner, as indicated in dashed outline in FIG. 1, it is possible to interconnect a plurality of housings together to form a block, thereby permitting differing equipment units to be easily interlinked with one another so that flow passages 1 of the individual equipment units will directly communicate one with one another.

If the air service unit consists of a water separator. (FIGS. 5 and 6), a threaded cover cap 24 is engaged with screw union 13, with a gasket 25 providing an appropriate seal. A collector bowl 26 is inserted in bayonet union 11, and a bell 27 is engaged in snap connection member 8. Bell 27 contains a filter 28 and its head 29 carries a receiving cylinder 30 which is surrounded by through openings 31. The periphery of head 29 contains a recess 32, for engagement with tongues 9. Located on a shoulder 33 of bell 27 is a swirl plate 34 retained in place in a non-rotatable manner but being permitted to axially shift between shoulder 33 and an end 35 of resilient tongues 9. Extending centrally from head 29 is a pin 36 in engagement with filter 28 through a hole 37 located therein. Collector bowl 26 has ribs 38, and a distributor plate 39 is seated on an upper end of these ribs. Tensioned between filter 28 and distributor plate 39, and surrounding pin 36, is a spring 40. A guide cylinder 42 in the area of screw union 13, located on side 12, is not needed for water separator 41.

If the air service unit is designed as a pressure regulating valve (FIGS. 7 and 8), a closure lid 43 is inserted in bayonet union 11. A receiving cylinder similar to 30 described for FIG. 5, is provided on lid 43. A compression spring member 44, having a setting knob thereon, is attached to the housing by means of screw union 13. A spring plate 46, guided in compression spring member 44, can be moved axially by means of setting knob 45, thereby permitting the pretension of a compression spring 47 to be set from the outside. One end of compression spring 47 is seated on a spring plate 48 which is guided in guide cylinder 42. Guided in receiving cylinder 30 is a valve body 49 connected to spring plate 48 by means of a nose 50 of the valve body which extends through valve face opening 7 as well as through a guide bore 50a provided in the housing.

Figure 9:
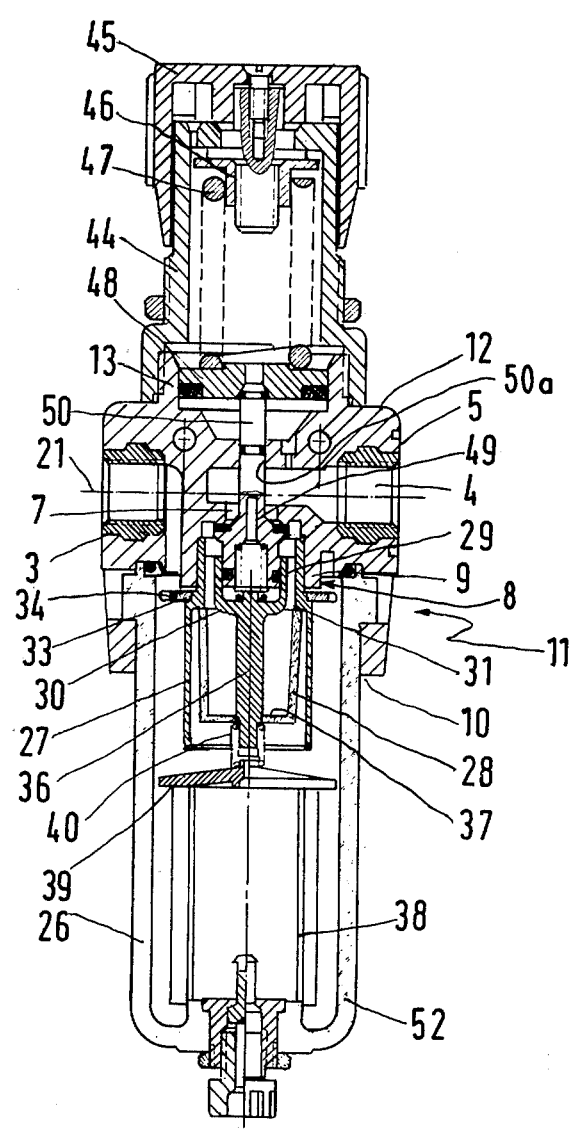
FIG. 9 is a vertical sectional view taken through the housing according to the invention in combination with a filter/pressure reducer and FIG. 10 is a side elevational view of FIG. 9.
Figure 10:
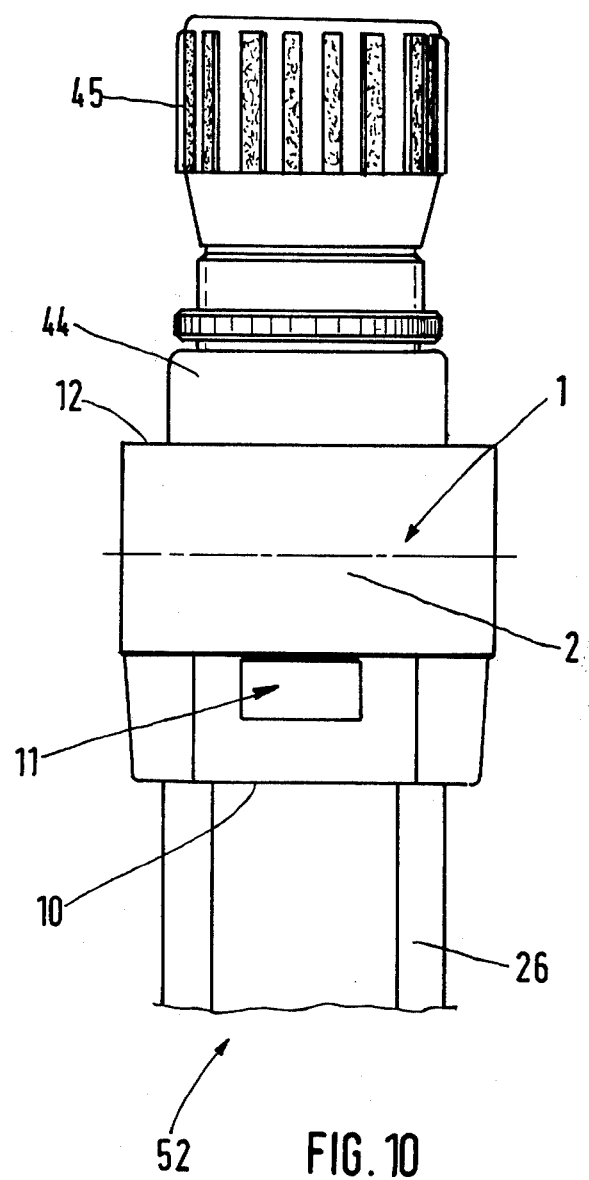

If the air service unit is designed as a filter/pressure reducer 52 (FIGS. 9 and 10), compression spring member 44 is attached by means of screw union 13, similarly as shown in FIG. 7, and a collector bowl 26 is connected by means of bayonet union 11, similarly as shown in FIG. 5. Bell 27 and filter 28 are therefore mounted in place similarly as described in FIG. 5. The compressed air flows through inlet 2, is advanced around bell 27 and through filter 28 to openings 31, and from there through valve face opening 7 into outlet 4, insofar as valve body 49 is lifted out of its seat. This is the case if the pressure of compression spring 47 exceeds the pressure of the flow medium. The pressure conditions can be influenced by the setting of knob 45, thereby permitting the pressure in flow passage 1 and in the attached line to be stipulated as desired.

Thus, the same plastic housing is employed for all three versions of the air service units, thereby permitting it to be fabricated in large quantities and stocked in a simplified manner. The individual units can be completed easily, as there is only a limited number of individual components which can be rapidly assembled by means of the connections.

Although my invention has been illustrated and described with reference of the preferred embodiments thereof, I wish to have it understood that it is in no way limited to the details of such embodiments, but is capable of numerous modifications within the scope of the appended claims.

Having thus fully disclosed my invention, what I claim is:

1. A housing capable of being interchanged for use with air service units such as a water separator, a pressure regulating valve or a filter/pressure reducer, comprising, a body member in the form of a cube having first, second and third pairs of opposing sidewalls with each said pair being perpendicularly related to the other pairs, said body member having a flow passage with an inlet and an outlet thereof disposed co-axially and being respectively located in said first opposing sidewalls, a receiving chamber and a valve seat located in the path of said passage, said body member having a bore for guiding a valve body capable of engaging the valve seat for controlling the flow through said passage, a bayonet connection union and a screw connection union respectively located on said second opposing sidewalls, a snap connection member recessed within said cube and lying adjacent said bayonet connection and said receiving chamber, and a guide cylinder located on the other of said second opposing sidewalls adjacent said screw connection union.

2. The housing according to claim 1, wherein said snap connection member includes a plurality of resilient tongues.

3. The housing according to claim 1, wherein said body member has recesses in said third opposing sidewalls, said recesses forming walls at said first opposing sidewalls, openings provided in said walls having axes parallel to said co-axial inlet and outlet to facilitate the joining of said body member together with a like body member with flow passages thereof in alignment.

* * * * *

UNITED STATES PATENT OFFICE
CERTIFICATE OF CORRECTION

PATENT NO. : 4,174,730
DATED : November 20, 1979
INVENTOR(S) : Roland Heilmann

It is certified that error appears in the above-identified patent and that said Letters Patent are hereby corrected as shown below:

In the title page, correct the name of the assignee to read "Festo-Mashinenfabrik Gottlieb Stoll, Esslingen, Federal Republic of Germany".

Signed and Sealed this

Third Day of June 1980

[SEAL]

*Attest:*

*Attesting Officer*

SIDNEY A. DIAMOND

*Commissioner of Patents and Trademarks*